United States Patent [19]
Cerny

[11] Patent Number: 5,326,207
[45] Date of Patent: Jul. 5, 1994

[54] SAFETY SCREW

[76] Inventor: Alexander Cerny, R.R. #1, Browning, Site C 16, Sechelt, British Columbia, Canada, V0N 3A0

[21] Appl. No.: 93,916
[22] Filed: Jul. 20, 1993
[51] Int. Cl.⁵ .................... F16B 15/00; F16B 39/06
[52] U.S. Cl. ................... 411/357; 411/140; 411/321; 411/948
[58] Field of Search ............ 411/140, 357, 358, 923, 411/948

[56] References Cited

U.S. PATENT DOCUMENTS

| 324,768 | 8/1885 | Hunt | 411/358 X |
| 793,269 | 6/1905 | Black . | |
| 824,017 | 6/1906 | Herdle . | |
| 922,543 | 5/1909 | Truston | 411/923 X |
| 1,156,811 | 10/1915 | Prince et al. | 411/357 |
| 1,184,173 | 5/1916 | Gehring | 411/140 |
| 1,829,293 | 10/1931 | Olson | 411/140 |
| 3,295,579 | 1/1967 | Medal | 411/140 |
| 3,908,235 | 9/1975 | Telliard et al. . | |
| 4,572,039 | 2/1986 | Desjardins . | |

FOREIGN PATENT DOCUMENTS 252195  9/1948 Switzerland .................. 411/358

Primary Examiner—Neill R. Wilson

[57] ABSTRACT

A screw having a threaded shaft, a head on the shaft and means to permit rotation of the screw. There is a longitudinal slot extending along at least a portion of the threaded shaft to receive a locking member. The invention has a particular application in a wood screw and the locking member is, preferably, a flat body having a sharpen tip. Using the invention a wood screw may be secured against vandalism.

5 Claims, 1 Drawing Sheet

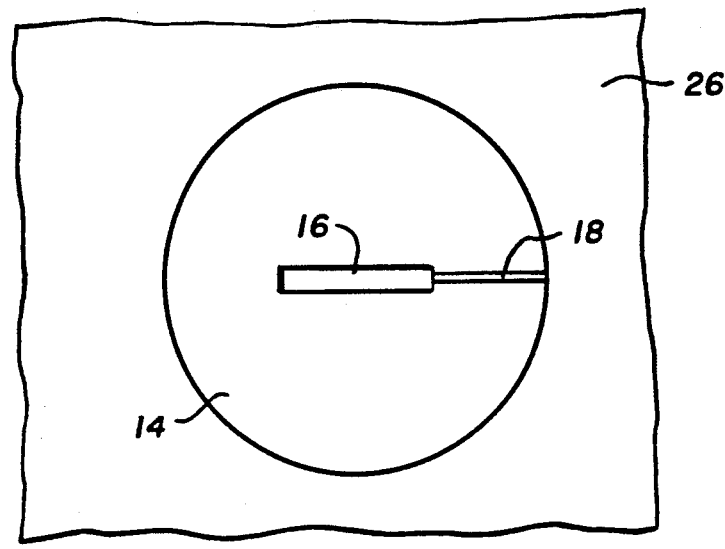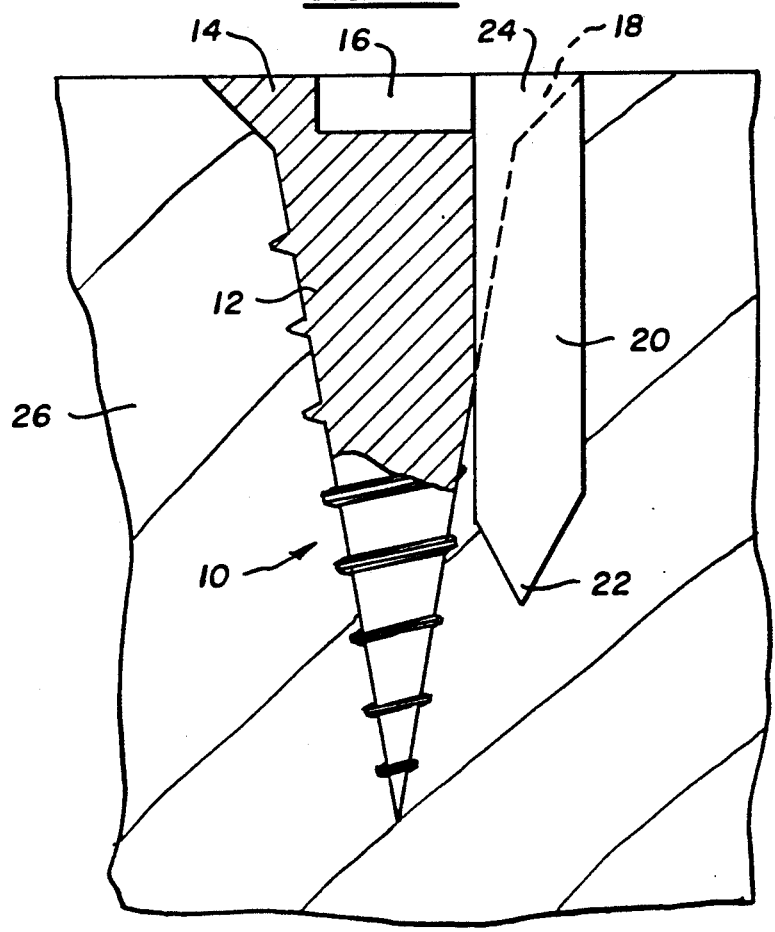

5,326,207

SAFETY SCREW

FIELD OF THE INVENTION

This invention relates t a screw that is tamper proof.

DESCRIPTION OF THE PRIOR ART

Vandalism is, unfortunately, increasingly common throughout the world. Breaking and entering and the like crimes are also increasing. Vandals and thieves may well carry with them screwdrivers to enable them to remove screws from the location they wish to vandalise or rob.

There have been a number of suggestions to produce vandal resistant or tamper proof screws so that even if the vandal is equipped with a screwdriver he will not be able to remove the screw. The general arrangement is that once the screw is inserted it is permanently installed.

Previous attempts at producing such screws have been relatively complicated. They involve, for example, frangible portions of the fastening member that break when a certain torque is applied to them. Thus the screw can be tightened using reasonable torque but additional torque is applied when the screw is properly located and that additional torque breaks off, for example, the upper portion of the head in which the driver receiving portion of the head is formed.

The prior art provides relatively complicated and relatively expensive systems, for example the notion of frangibility introduces complications into what is otherwise a simple method of producing screws, bolts and the like.

SUMMARY OF THE INVENTION

The present invention therefore seeks to provide a simplified tamper proof screw. The invention is of particular application to wood screws.

Accordingly the present invention provides a screw having a threaded shaft, a head on the shaft and means to permit rotation of the screw in the head, and is the improvement comprising a longitudinal slot extending along at least a portion of the threaded shaft to receive a locking member.

The locking member is usually a flat body having a sharpened tip and a flat head. The arrangement is such that the screw is located and the locking member is then driven home, typically with a hammer.

DESCRIPTION OF THE DRAWINGS

The invention is illustrated in the drawings in which:

FIG. 1 is a plan view of a head of a screw according to the present invention; and FIG. 2 is a view, partially in section, of a wood screw locked in place with a locking member.

DESCRIPTION OF THE PREFERRED EMBODIMENTS

The drawings show a wood screw 10 having a threaded shaft 12 and a head 14 on the shaft. There is conventional means to permit rotation of the screw. For example the illustrated embodiment of the invention has a slot 16, which is probably the best known means of providing driving force by a screwdriver. However the invention is equally applicable with Phillip's heads, Robert's heads or heads provided with hexagonal recesses. In fact it will be appreciated that the invention is applicable to any type of screw.

The screw 10 is formed with a longitudinal slot 18 extending from the head 14, as shown in FIG. 2 and at least partially along the threaded shaft 12.

As shown particularly in FIG. 2, the shaft 12 receives a locking member 20 which, in the illustrated embodiment, is a flat body having a sharpened tip 22 and a flat top 24, remote from the tip 22.

The invention is used as follows. The screw 10 is driven into place in conventional manner, that is using a hand or power screwdriver. Once in position the locking member 24 is positioned in the longitudinal slot 18, at the head 14 of the screw 10, and driven downwardly using a hammer. The slot 18 acts as a guide for the locking member 20 as the member 20 is driven home. Once the locking member 20 is in position it prevents rotation of the screw 10 relative to the locking member.

The invention finds particular application in wood screws where the locking member 20 may easily be driven home into a wooden body 26. However the invention is also applicable for metal screws where it would be necessary to drill a hole in the piece of metal receiving the screw prior to inserting the locking member. In those circumstances it is probable that the locking member would have to be glued in position using, for example, a methacrylate adhesive.

The drawings illustrate a particular embodiment of the invention but several variations are possible. For example the slot 16 to receive the screwdriver is shown occupying only a part of the head. In fact the conventional arrangement in which the slot 16 extends completely across the head is appropriate. The longitudinal slot 18 to receive the locking member 20 is shown as an extension of the slot 16 but need not be. It need not be radial. It is only sufficient that it can receive the locking member 20 and that the locking member 20 can prevent rotation of the screw 10 once it is in position.

Although the forgoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. In a screw having a threaded shaft, a head on the shaft, said head including means to permit rotation of the screw and said threaded shaft narrowing with distance from said head, the improvement comprising a longitudinal slot extending along at least a portion of the threaded shaft to receive a locking member, said slot being unobstructed at its end remote from the head, to permit the path followed by the locking member to be a straight line.

2. A screw as claimed in claim 1 in the form of a wood screw.

3. A screw as claimed in claim 1 in which the locking member is a flat body having a sharpened tip.

4. A screw as claimed in claim 3 in which the locking member is flat at the end remote from the tip.

5. In combination, a screw having a threaded shaft, a head on the shaft, said head including means to permit rotation of the screw, and said shaft narrowing with distance from the head, a longitudinal slot extending from the head along the threaded shaft to receive a locking member, said slot being unobstructed at its end remote from the head to avoid distortion of the locking member; and a locking member able to locate in the slot to prevent the screw from rotating, said slot having a depth less than the width of the locking member whereby the locking member, in the locking position, protrudes radially from the slot.

* * * * *